(12) United States Patent
Jagan et al.

(10) Patent No.: US 11,182,560 B2
(45) Date of Patent: Nov. 23, 2021

(54) SYSTEM AND METHOD FOR LANGUAGE INDEPENDENT ITERATIVE LEARNING MECHANISM FOR NLP TASKS

(71) Applicant: Wipro Limited, Bangalore (IN)

(72) Inventors: Balaji Jagan, Bangalore (IN); Gopichand Agnihotram, Bangalore (IN); Meenakshi Sundaram Murugeshan, Bangalore (IN)

(73) Assignee: Wipro Limited, Bangalore (IN)

( * ) Notice: Subject to any disclaimer, the term of this patent is extended or adjusted under 35 U.S.C. 154(b) by 138 days.

(21) Appl. No.: 16/370,902

(22) Filed: Mar. 30, 2019

(65) Prior Publication Data
US 2020/0265117 A1   Aug. 20, 2020

(30) Foreign Application Priority Data
Feb. 15, 2019   (IN) .............................. 201941006161

(51) Int. Cl.
*G06F 17/00*  (2019.01)
*G06F 40/30*  (2020.01)
*G06N 20/00*  (2019.01)
*G06F 40/284*  (2020.01)

(52) U.S. Cl.
CPC ............ *G06F 40/30* (2020.01); *G06F 40/284* (2020.01); *G06N 20/00* (2019.01)

(58) Field of Classification Search
CPC .................. G06F 16/9024; G06F 40/30; G06F 16/24578; G06F 16/35; G06F 16/355; G06F 16/243; G06F 40/284; G06F 16/24564; G06F 16/3329; G06F 16/367; G06F 16/78; G06F 40/263; G06F 40/295; G06F 16/313; G06F 40/00; G06F 40/205; G06F 40/211; G06F 40/289; G06F 40/20; G06N 20/00; G06N 3/0472
See application file for complete search history.

(56) References Cited

U.S. PATENT DOCUMENTS

| | | |
|---|---|---|
| 4,914,590 A | 4/1990 | Loatman et al. |
| 8,527,262 B2 | 9/2013 | Kambhatla et al. |
| 8,943,051 B2 * | 1/2015 | Fan .......................... G06F 40/55 707/728 |
| 9,152,623 B2 | 10/2015 | Wroczynski et al. |
| 10,120,858 B2 * | 11/2018 | Yannam ................ G06F 16/243 |
| 10,977,155 B1 * | 4/2021 | Muras .................. G06F 11/3684 |

(Continued)

*Primary Examiner* — Michael Ortiz-Sanchez
(74) *Attorney, Agent, or Firm* — Finnegan, Henderson, Farabow, Garrett & Dunner, LLP (57) ABSTRACT

A method and system of language independent iterative learning mechanism for Natural Language Processing (NLP) tasks is disclosed. The method includes identifying at least one NLP feature associated with a set of words within a sentence for an NLP task. The method includes creating a pattern associated with the sentence for the NLP task, based on the at least one NLP feature associated with the set of words and the linkage relationship between each subset of two adjacent words. The method further includes computing a confidence score corresponding to the pattern, based on a comparison within a trained dataset. The method further includes assigning a pattern category to the pattern, based on the confidence score and a predefined threshold score. The method further includes executing the NLP task based on the assigned pattern category.

15 Claims, 7 Drawing Sheets

(56) References Cited

U.S. PATENT DOCUMENTS

| | | | |
|---|---|---|---|
| 2008/0319735 A1* | 12/2008 | Kambhatla | G06F 40/30 |
| | | | 704/9 |
| 2012/0271627 A1* | 10/2012 | Danielyan | G06F 40/55 |
| | | | 704/9 |
| 2014/0163959 A1* | 6/2014 | Hebert | G06F 40/30 |
| | | | 704/9 |
| 2016/0012038 A1* | 1/2016 | Edwards | G06F 40/30 |
| | | | 704/9 |
| 2019/0163789 A1* | 5/2019 | Ackermann | G06F 16/24564 |
| 2019/0243898 A1* | 8/2019 | Walker | G06F 40/253 |

* cited by examiner

| Semantic Words | Similarity Score with "Personal" |
|---|---|
| trainer | 0.7027438 |
| training | 0.701905 |
| coach | 0.6601389 |
| strength | 0.5926052 |
| skills | 0.5884485 |
| professional | 0.58168894 |
| step | 0.5689112 |

(502)

| Semantic Words | Similarity Score with "Suggestion" |
|---|---|
| aggression | 0.6130105 |
| mind | 0.5886627 |
| intuition | 0.57641315 |
| depression | 0.5744585 |
| movement | 0.56805474 |
| brain | 0.56038237 |
| meditation | 0.5944612 |
| tradition | 0.5567069 |

SYSTEM AND METHOD FOR LANGUAGE INDEPENDENT ITERATIVE LEARNING MECHANISM FOR NLP TASKS

TECHNICAL FIELD

This disclosure relates generally to Natural Language Processing (NLP) tasks, and more particularly to system and method for language independent, iterative learning mechanism for NLP tasks.

BACKGROUND

Natural Language Processing (NLP) plays a vital role in many applications, such as, information retrieval, information extraction, machine translation, or the like. In order to perform any of the aforementioned applications, there is a need to handle certain basic NLP tasks, which are important and unavoidable. Some of the NLP tasks include, but are not limited to semantic relations identification, pronoun resolution, word sense disambiguation, named entity recognition, or the like. Moreover, language specific resources, such as, morphological analyzer, Part Of Speech (POS) tagger, or parser, are required to build such components. Building such NLP tasks for multiple languages from scratch is a time consuming and tedious process.

In conventional systems, there is no single universal platform that can tackle all the NLP tasks in one platform. Moreover, no such universal platform caters to multi-lingual requirements for any NLP task. In some of the conventional systems, multi-lingual tasks in NLP may be handled separately and lack in accuracy and efficiency. Thus, the conventional systems lack in language independent iterative learning mechanism for NLP task.

SUMMARY

In one embodiment, a method of language independent iterative learning mechanism for Natural Language Processing (NLP) tasks is disclosed. In one embodiment, the method may include identifying at least one NLP feature associated with a set of words within a sentence for an NLP task. The method may further include identifying a linkage relationship between each subset of two adjacent words within the set of words. The method may further include creating a pattern associated with the sentence for the NLP task, based on the at least one NLP feature associated with the set of words and the linkage relationship between each subset of two adjacent words. The method may further include computing a confidence score corresponding to the pattern, based on a comparison within a trained dataset. The method may further include assigning a pattern category to the pattern, based on the confidence score and a predefined threshold score, wherein the pattern category corresponds to the NLP task and the method may further include executing the NLP task based on the assigned pattern category.

In another embodiment, a system for language independent iterative learning mechanism for NLP tasks is disclosed. The system includes a processor and a memory communicatively coupled to the processor, wherein the memory stores processor instructions, which, on execution, causes the processor to identify at least one NLP feature associated with the set of words within the sentence for the NLP task. The processor instructions further cause the processor to identify the linkage relationship between each subset of two adjacent words within the set of words. The processor instructions cause the processor to create the pattern associated with the sentence for the NLP task, based on the at least one NLP feature associated with the set of words and the linkage relationship between each subset of two adjacent words. The processor instructions further cause the processor to compute the confidence score corresponding to the pattern, based on the comparison within the trained dataset. The processor instruction cause the processor to assign the pattern category to the pattern, based on the confidence score and the predefined threshold score. The processor instruction cause the processor to execute the NLP task based on the assigned pattern category.

In yet another embodiment, a non-transitory computer-readable storage medium is disclosed. The non-transitory computer-readable storage medium has instructions stored thereon, the set of computer-executable instructions causing the computer comprising one or more processors to perform steps comprising identifying at least one NLP feature associated with the set of words within the sentence for the NLP task; identifying the linkage relationship between each subset of two adjacent words within the set of words; creating the pattern associated with the sentence for the NLP task, based on the at least one NLP feature associated with the set of words and the linkage relationship between each subset of two adjacent words; computing the confidence score corresponding to the pattern, based on the comparison within the trained dataset; assigning the pattern category to the pattern, based on the confidence score and the predefined threshold score, wherein the pattern category corresponds to the NLP task; and executing the NLP task based on the assigned pattern category.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Additional illustrative embodiments are listed below. In one embodiment, a system 100 for language independent iterative learning mechanism for Natural Language Processing (NLP) tasks is illustrated in the FIG. 1, in accordance with an embodiment. The system 100 includes an NLP device 102 configured to perform language independent iterative learning mechanism for NLP tasks. The NLP tasks, for example, may include but are not limited to semantic relations identification, pronoun resolution, word sense disambiguation, or named entity recognition. The NLP device 102 is a universal and language independent device that handles various NLP tasks using a semi-supervised iterative learning approach. Examples of the NLP device 102 may include, but are not limited to an application server, a laptop, a desktop, an application server, a smart phone, or a tablet.

Figure 1:
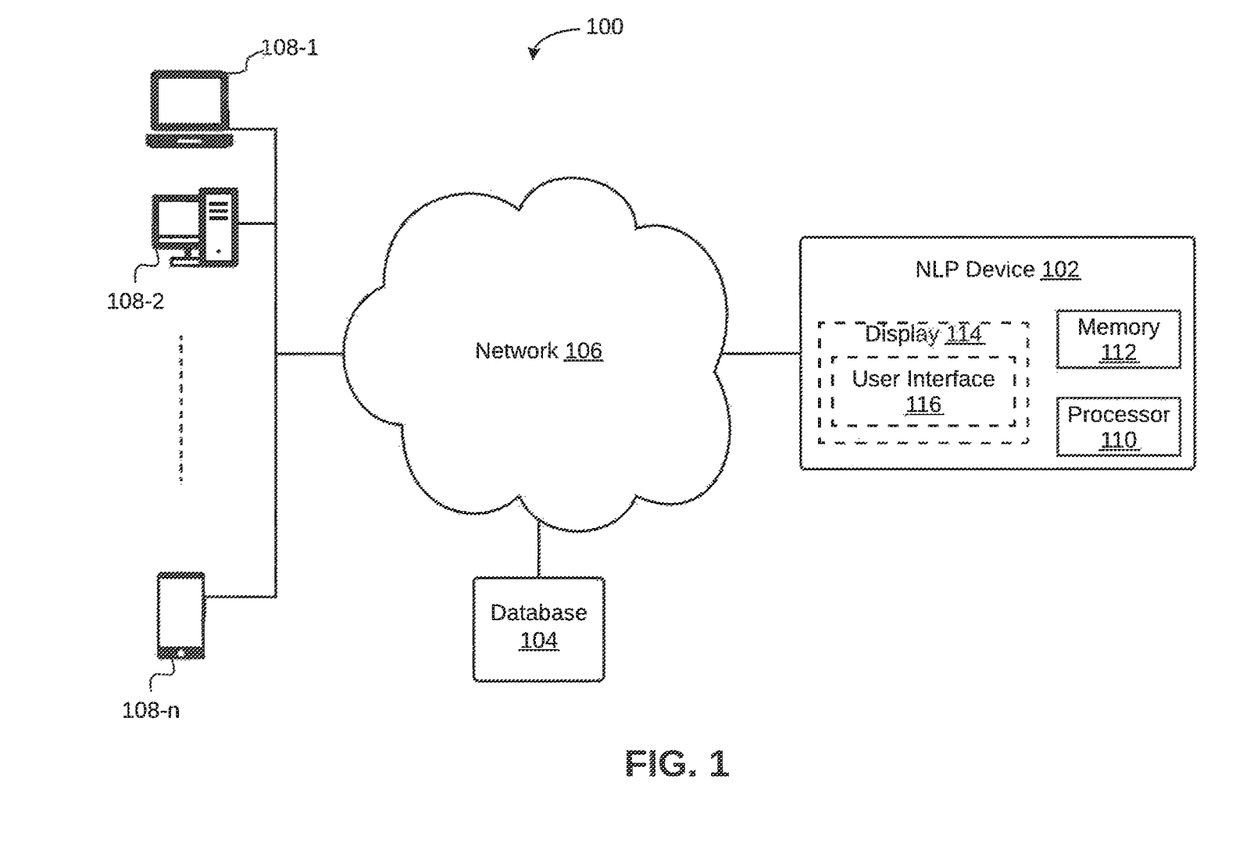
FIG. 1 is a block diagram illustrating a system for language independent iterative learning mechanism for Natural Language Processing (NLP) tasks, in accordance with an embodiment.

The NLP device 102 may communicate with a database 104 that may include training data which may be used to train the NLP device 102, via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The NLP device 102 may further communicate with computing devices 108-1 to 108-n (collectively referred to as a plurality of computing devices 108), via the network 106. The plurality of computing devices 108 may require execution of applications that may include, but are not limited to information retrieval, information extraction, machine translation, or the like. The NLP device 102 may handle NLP tasks associated with these applications in order to enable execution of these applications. In other words, the plurality of computing devices 108 may provide test data to the NLP device 102.

To this end, the NLP device 102 may include a processor 110 that is communicatively coupled to a memory 112, which may be a non-volatile memory or a volatile memory. Examples of the non-volatile memory, may include, but are not limited to a flash memory, a Read Only Memory (ROM), a Programmable ROM (PROM), Erasable PROM (EPROM), and Electrically EPROM (EEPROM) memory. Examples of the volatile memory may include, but are not limited Dynamic Random Access Memory (DRAM), and Static Random-Access memory (SRAM).

The memory 112 may further include various modules that enable the NLP device 102 to perform language independent iterative learning mechanism for NLP tasks. These modules are explained in detail in conjunction with FIG. 2. The NLP device 102 may further include a display 114 having a User Interface (UI) 116 that may be used by a user or an administrator to provide various inputs to the NLP device 102. The display 114 may further be used to display a result of the analysis performed by the NLP device 102. The functionality of the NLP device 102 may alternatively be configured as a distributed system, such that each module within the memory 112 may be implemented as a separate system.

Figure 2:
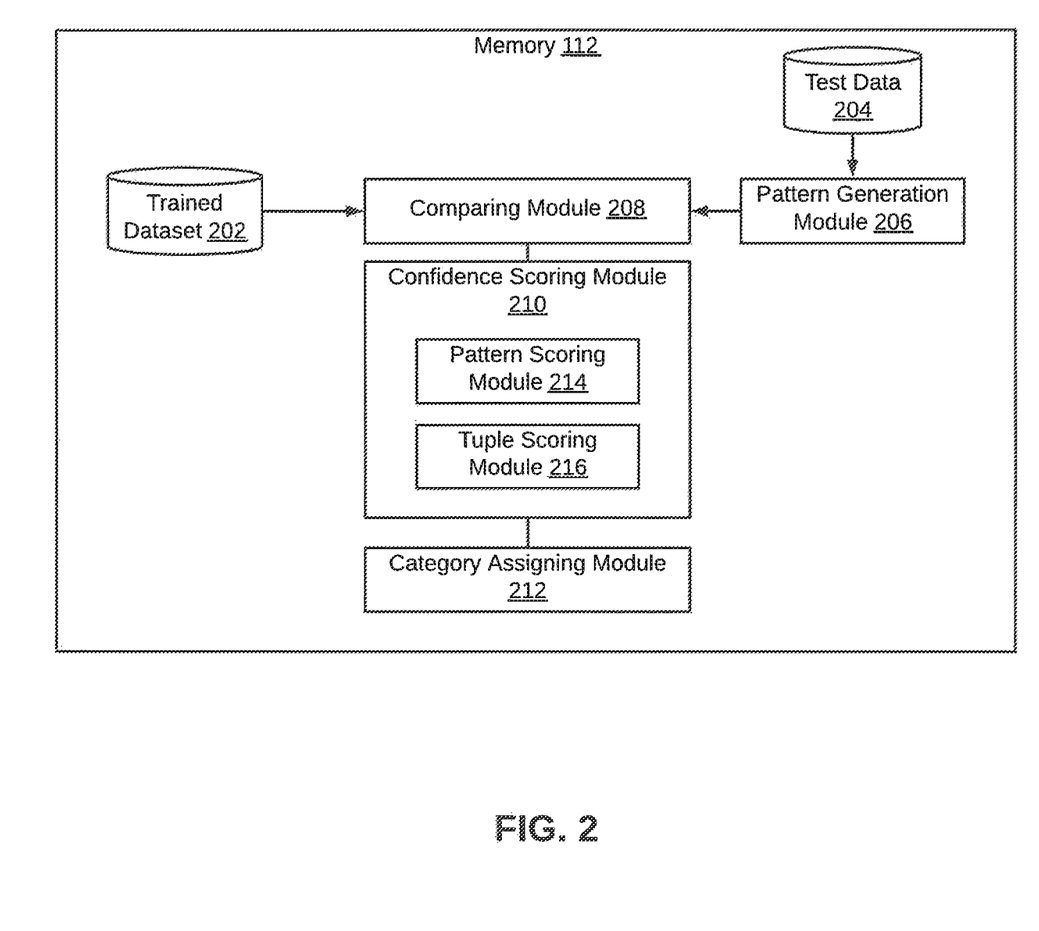
FIG. 2 is a block diagram illustrating various modules within a memory of an NLP device configured to perform language independent iterative learning mechanism for NLP tasks, in accordance with an embodiment.

Referring to FIG. 2, a block diagram of various modules within the memory 112 of the NLP device 102 configured to perform language independent iterative learning mechanism for NLP tasks is illustrated, in accordance with an embodiment. In the memory 112 a trained dataset 202 that includes a plurality of unique patterns (i.e., example patterns) in which NLP features are defined in a sequence. The NLP features, for example, may include, but are not limited to morphological suffixes, Part Of Speech (POS) tags, stemming, hypernym, hyponym, Anaphors, or semantic category. The NLP features are e such that they meet universal standard (i.e., which are common and acceptable standard across various languages). The trained dataset 202 further includes a plurality of unique tuples that are derived from the plurality of unique patterns. This is further explained in detail in conjunction with FIG. 3.

The plurality of unique patterns are created for various NLP tasks in a universal manner. In other words, in an embodiment, the plurality of unique patterns may be able to cater to morphologically rich nature of languages. In another embodiment, the plurality of unique patterns may be able to balance both partial free-word order nature and syntax-based languages characteristics. Word order is the study of the order of the syntactic constituents of a language, and how different languages may employ different orders. The primary word orders that are of interest may include, but are not limited to constituent order of a clause, the relative order of subject, object, and verb, the order of modifiers (adjectives, numerals, demonstratives, possessives, and adjuncts) in a noun phrase, and the order of adverbials. Some other languages use relatively restrictive word order, often relying on the order of constituents to convey important grammatical information. In computer science, the syntax of a computer language is the set of rules that defines the combinations of symbols that are considered to be a correctly structured sentences in that language. Computer language syntax is generally distinguished into three levels. Words, which form the lexical level, determine how characters form tokens. Phrases, which form the grammar level, determine how tokens form phrases. Lastly, context, which determine what objects or variables names refer to, if types are valid, etc. In another embodiment, the plurality of unique patterns may be able to handle cases where some of the properties are absent in one language and not in other languages.

Once the plurality of unique patterns are created for various NLP tasks, a sentence may be extracted from a test dataset 204 and a pattern generation module 206 identifies one or more NLP features associated with a set of words within the sentence for an NLP task. The pattern generation module 206 then identifies a linkage relationship between each subset of two adjacent words within the set of words. Thereafter, the pattern generation module 206 creates a pattern associated with the sentence for the NLP task, based on the one or more NLP features associated with the set of words and the linkage relationship between each subset of two adjacent words. This is further explained in detail in conjunction with FIG. 3.

For a given NLP task, a comparing module 208 compares the pattern with the plurality of unique patterns and tuples within the pattern with the plurality of unique tuples derived from the plurality of unique patterns. Based on the comparing, when the pattern matches with a unique pattern, a confidence scoring module 210 determine a confidence score for the pattern with respect to the unique pattern. When the confidence score is greater than a predefined threshold, a category assigning module 212 assigns the same pattern category or a semantic category as the unique pattern, to the pattern.

In an embodiment, the confidence score may be based on a weighted sum of a first confidence score and second confidence score. The first confidence score may be a pattern confidence score that is determined for the pattern by a pattern scoring module 214. The pattern confidence score is independent of the language associated with the sentence. The pattern confidence score is derived based on a percentage match of the pattern with one of the plurality of unique patterns in the trained dataset. This is further explained in detail in conjunction with FIG. 3. When there is sufficient information in the trained dataset 202 for identifying a unique pattern that matches with the pattern created by the pattern generation module 206, only the first confidence score may be relied on. In other words, the second confidence score may be assigned a value of zero.

The second confidence score is a tuple confidence score which is determined for each of the set of words in the sentence by a tuple scoring module. A tuple in the sentence may be a unigram or bigram within the sentence. The tuple confidence score is dependent of the language associated with the sentence. In an embodiment, the tuple confidence score may be derived based on semantic similarity with one or more of the plurality of unique tuples within the trained dataset 202. This is further explained in detail in conjunction with FIG. 3. This may be used when an under-fitting problem in the machine learning based automatic learning mechanism of the NLP device 102 may occur, as explained below.

Once the pattern is assigned a pattern category, the pattern is given to the test dataset 204 in order to obtain similar instances in the test dataset 204. The semantic category of the instances is obtained through ontology of concepts stored in a hierarchical manner. This process is iteratively continued till no more new patterns are obtained and/or no instances are available in the test dataset 204. This is further explained in detail in conjunction with FIG. 3 and FIG. 6.

In general, while performing any machine learning based automatic learning mechanism, there is a possibility of getting over-fitting and under-fitting problem. In the NLP device 102, there is a possibility of getting over-fitting while performing multiple iterations over the test dataset 204. In order to overcome this issue, the number of iterations may be limited based on a threshold value. The threshold value may be determined based on the average number of iterations taken to obtain the desired outcome, i.e., a pattern match.

Figure 5:
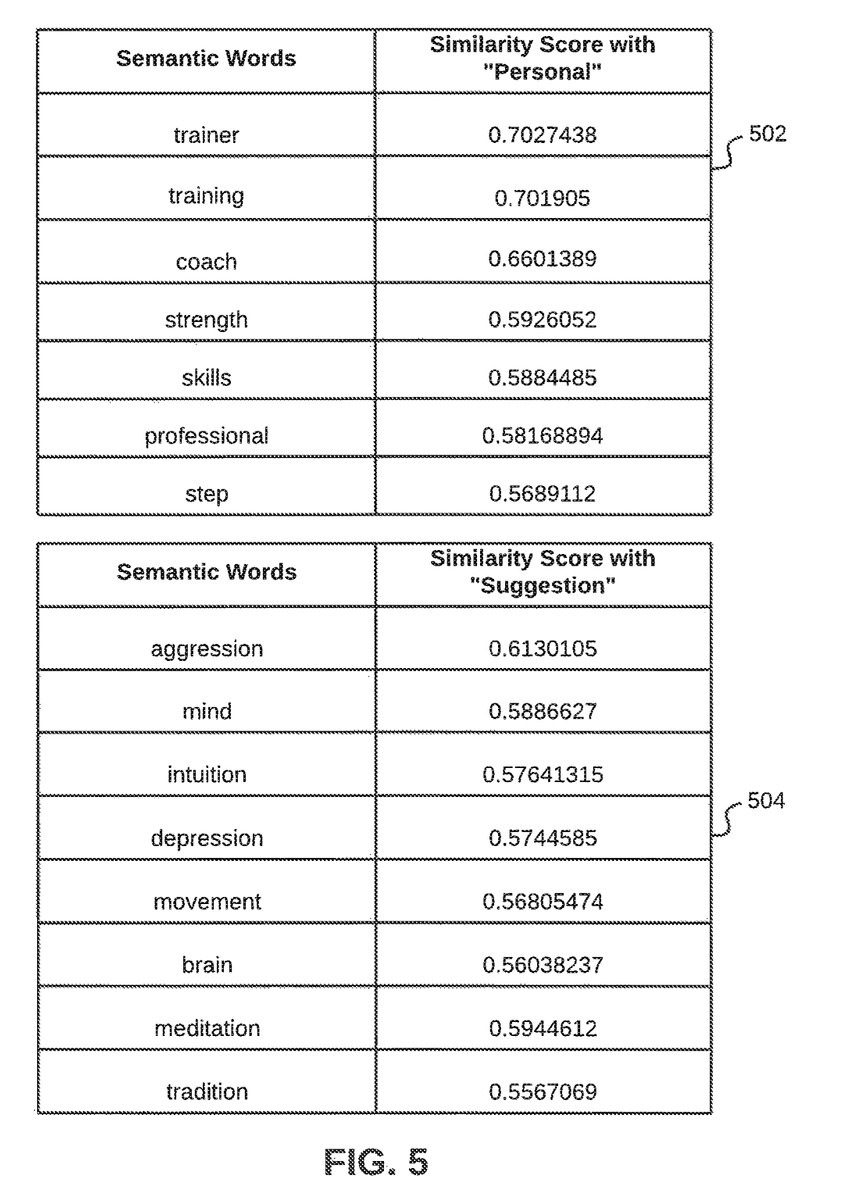
FIG. 5 illustrates similarity scores for nearest words in the vector space that are used to determine tuple confidence scores, in accordance with an exemplary embodiment.

The under-fitting problem may occur when there is insufficient information in the trained dataset 202 for identifying a unique pattern that matches with the pattern created by the pattern generation module 206. This may occur, when the first confidence score is less than the predefined threshold score. To avoid this issue, the second confidence score, i.e., the tuple confidence scores are taken into consideration. In other words, weightage assigned to the second confidence score is increased. This is further explained in detail in conjunction with FIG. 3 and FIG. 5. By way of an example, 10 different unique patterns may be there under a particular pattern category. Among these 10 patterns, we need to select at least two patterns that having high tuple confidence scores when matched with an example pattern, in order to assign the pattern category to the example pattern.

Figure 3:
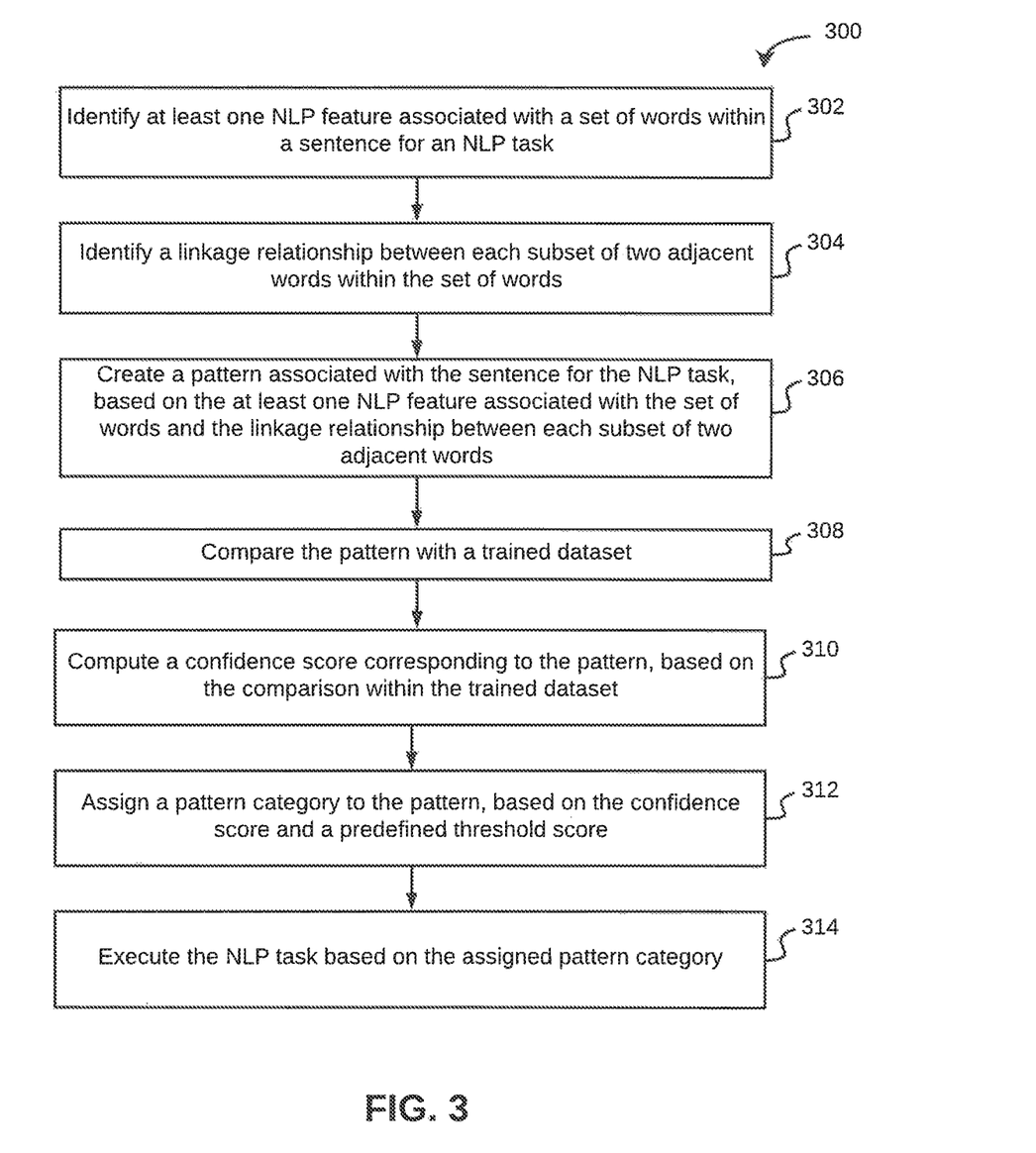
FIG. 3 illustrates a flowchart of a method for language independent iterative learning mechanism for NLP tasks, in accordance with an embodiment.

Referring now to FIG. 3, a flowchart of a method 300 for language independent iterative learning mechanism for NLP tasks is illustrated, in accordance with an embodiment. To start with, the NLP device 102 determines an NLP task that needs to be performed. The NLP task, for example, may include, but is not limited to semantic relations identification, pronoun resolution, word sense disambiguation, or named entity recognition, semantic interpretation of complex sentences, anaphora and co-reference resolution, and semantic based summarization. The NLP task may need to be performed for one or more applications that may include, but are not limited to information retrieval, information extraction, machine translation, chatting application, or the like. For the NLP task, the NLP device 102, at step 302, identifies one or more NLP features associated with a set of words within a sentence. Thus, in an embodiment, the one or more NLP features may only be identified for a subset of words in the sentence. By way of an example, the sentence may be a part of a textual or verbal conversation or a part of a document that is being translated.

Examples of an NLP features, may include but are not limited to morphological suffixes, POS tags, stemming, hypernym, hyponym, Anaphors, or semantic category. Thus, instead of using structure based syntactic features that are usually used in languages, for example English or the like, word based morphological and semantic features are used as NLP features for performing various NLP tasks. Morphological suffixes and word associated semantic features convey information that may be required for NLP processing in morphologically rich languages. Thus, the method 300 is language independent.

At step 304, the NLP device 102 identifies a linkage relationship between each subset of two adjacent words within the set of words. The linkage relationship is also derived from the sentence. By way of an example, the sentence may be: "Tom completed his Phd in California University." The one or more words may be identified as "Tom," "his," and "California University." The linkage relationship between "Tom" and "his" would be "completed." Similarly, the linkage relationship between "his" and "California University" would be "Phd in." This forms a pattern which may be depicted as a graphical pattern 402 in FIG. 4.

In continuation of the example above, for the given sentence the NLP features of morphological suffixes, POS tags, and semantic category may be identified. For the word "Tom," the POS tag may be identified as "Noun" and the semantic category as "Name of the person." For the linkage relationship "did," the POS tag may be identified as "verb" and the tense as "past tense." For the word "his," the POS tag may be identified as "Pronoun." For the linkage relationship "Phd in," the POS tags may be identified as "noun" and "Proposition." Lastly, for the word "California university," the POS tags may be identified as "Noun" and "Noun," and the semantic category of California as "Place."

Based on the at one or more NLP feature associated with the set of words and the linkage relationship between each subset of two adjacent words, the NLP device 102, at step 306, creates a pattern associated with the sentence for the NLP task. The pattern includes a sequence of the set of words. In the pattern, each subset of two adjacent words in the sequence are interlinked based on an associated linkage relationship. The pattern may include a plurality of tuples. In continuation of the example above, the following tuples may be identified (specific to the NLP feature of POS tags):

Tom=(POS tag→"Noun")
Did=(POS tag→"Verb," Tense→"past tense")
His=(POS tag→"Pronoun")
Phd=(POS tag→"Noun")
In=(POS tag→"Proposition")
California=(POS tag→"Noun")
University=(POS tag→"Noun")

Figure 4:
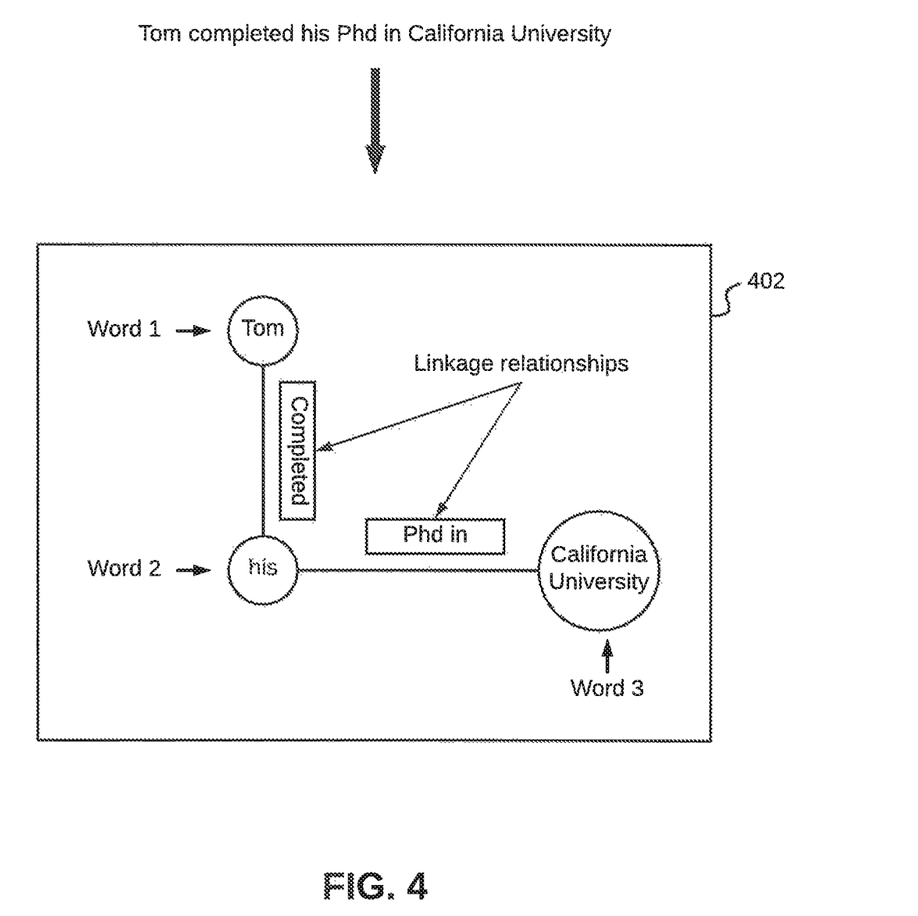
FIG. 4 illustrates a graphical pattern that is generated for a sentence, in accordance with an exemplary embodiment.

A pattern may be defined based on the complexity associated with the NLP task under consideration. A pattern may be a linear pattern with essentially word-based NLP features. By way of an example, a linear pattern may be represented as: F(W1) Relation1 F(W2) Relation2 F(W3). In this linear patter, F(W1), F(W2), and F(W3) represent NLP features associated with the respective words, i.e., W1, W2, and W3. Similarly, "Relation 1" and "Relation 2" represent NLP features associated with linkage relationship between the adjacent words. A pattern may be a graph-based pattern for handling contextual features. This has been explained above, by way of an example. The graphical pattern 402 for the example given above is depicted in FIG. 4. Representation of semantic data for a sentence as patterns enables tackling of characteristics associated with multiple languages.

At step 308, the NLP device 102 may compare the pattern within a trained dataset. The trained dataset is created for the NLP task and includes a plurality of unique patterns. By way of an example, for a sentence, i.e., John killed Mary, multiple different patterns may be included in the trained dataset. These multiple different patterns may correspond to the following sentences: "John Kill Mary," "Mary killed by John," or "Mary was killed by John."

In the trained dataset, each of the plurality of unique patterns corresponds to the one or more NLP features derived for the NLP task. In other words, one unique pattern may be for POS tags, while other unique pattern may be for semantic category. By way of an example, for a sentence: "Rob Lives in Canada from 1980 onwards," a pattern created for POS feature may be represented as: [Noun, verb, Preposition, Noun, Preposition, Number, Adverb]. This pattern may be compared with existing unique patterns in the trained dataset. The trained dataset may also include a plurality of unique tuples that are derived from the plurality of unique patterns. Identification of Tuples from a sentence has been explained above in detail. Thus, while comparing the pattern with the plurality of unique patterns, tuples derived from the pattern are also compared with the plurality of unique tuples in the trained dataset.

Based on the comparison, a confidence score corresponding to the pattern may be computed at step 310. The confidence score may be derived based on a weighted average of a first confidence score and a second confidence score. It will be apparent to a person skilled in the art that the confidence score may be derived based on other statistical means. In an embodiment, an administrator may determine the weightage to be assigned to each of the first and second confidence scores.

The first confidence score may be a pattern confidence score that is determined for the pattern. The pattern confidence score is independent of the language associated with the sentence. The pattern confidence score is derived based on a percentage match of the pattern with one of the plurality of unique patterns in the trained dataset. By way of an example, the trained dataset may include two unique patterns, i.e., $S_1$ and $S_2$, which may be represented by equations 1 and 2 given below:

$$S_1 = (P_{11}, P_{12}, P_{13}, \ldots, P_{1n}) \quad (1)$$

$$S_2 = (P_{21}, P_{22}, P_{23}, \ldots, P_{2n}) \quad (2)$$

The POS pattern for $S_1$ associated with the NLP feature of POS tags may be represented by equation 3 given below:

$$S_1 = (\text{Noun, verb, Preposition, Noun, Preposition, Number, Noun}) \quad (3)$$

For an input sentence "Rob Lives in Canada from 1980 onwards," the pattern associated with the NLP feature of POS tags may be represented by equation 4 given below:

$$(\text{Noun, verb, Preposition, Noun, Preposition, Number, Adverb}) \quad (4)$$

In order to compute the pattern confidence score for the input sentence when compared to $S_1$, the pattern given in equation 4 is matched with the pattern given in equation 3. The pattern confidence score may be determine using Natural Language Toolkit (NLTK) POS tagging library. The following scores may be computed:

$P_{11}$ Noun may have a confidence score of 90%
$P_{12}$ Verb may have a confidence score of 90%
$P_{13}$ Preposition may have a confidence score of 90%
$P_{14}$ Noun may have a confidence score of 90%
$P_{15}$ preposition may have a confidence score of 90%
$P_{16}$ number may have a confidence score of 90%
$P_{17}$ noun may have a confidence score of 40%

The pattern confidence score may thus be determined as an average of the above confidence scores, i.e., 82.85%.

The second confidence score is a tuple confidence score which is determined for each of the set of words in the sentence. A tuple in the sentence may be a unigram or bigram within the sentence. The tuple confidence score is dependent of the language associated with the sentence. In an embodiment, the tuple confidence score may be derived based on semantic similarity with one or more of the plurality of unique tuples within the trained dataset. In another embodiment, semantic word-embeddings and their morphological suffixes along with confidence score of each NLP feature in a tuple may be derived to determine the tuple confidence score for the tuple. By way of an example, in the sentence: "I met Ramesh personally to provide my suggestions." In this example, morphological suffixes for "Personally" is "Personal" with confidence score of 94%, which is determined using the NLTK POS tagging library. The word-embeddings or nearest words in the vector space for the words "Personal" and "Suggestion" along with their respective similarity scores are given in a table 502 and a table 504 respectively of FIG. 5. The combination of these scores may be used to derive a tuple confidence score for a given word in the sentence.

Thus, the pattern associated with the sentence may be compared with a unique pattern in the trained dataset to determine a pattern confidence score. Thereafter, each tuple within the pattern may also be compared with tuples in the unique pattern to determine tuple confidence score for each tuple in the pattern. The confidence score for the pattern may then be derived based on the pattern confidence score for the pattern and the tuple confidence scores for the words within the sentence.

Thereafter, based on the confidence score and a predefined threshold score, the NLP device 102, at step 312 assigns a pattern category to the pattern. The pattern category is that of a unique pattern with which the pattern was compared and confidence score was generated. In an embodiment, when the confidence score is more than the predefined threshold, the pattern category may be assigned to the pattern. However, when the confidence score is below the predefined threshold, the pattern may be identified as a new pattern. This is further explained in detail in conjunction with FIG. 6. The pattern category corresponds to the NLP task. At step 314, the NLP device 102 executes the NLP task based on the assigned pattern category. The NLP task may be executed within an application. By way of an example, the application may be machine translation of an input sentence from an origin language to a target language. In this case, the NLP task may be word sense disambiguation. Thus, a pattern based on the NLP feature of POS tags may be created. The pattern may be matched with unique patterns created for various sentences in the target language. When the pattern matches with one of the unique patterns, a pattern category associated with that unique pattern is assigned to the pattern. The pattern category may include multiple unique patterns that are created for similar sentences, Thus, as an output of the machine translation, one of the sentences associated with the multiple unique patterns in the pattern category may be provided. The degree of match the pattern of the input sentence with the unique pattern associated with the output sentence may be the highest.

By way of an example of the method 300, a conversation engine may employ the method 300 to drive interviews supporting multiple languages. Input to the conversation engine at any point in a conversation may include the following features: contextual features and utterance features. The contextual features refer to various entities that may currently be discussed in the conversation. The utterance features may be specific to a current user utterance, which may include "partial queries" or "queries with anaphors." The current user utterance may refer to the entities in the ongoing conversation. The type of features used employed by the conversation engine may be that each verb imposes sectional restrictions on roles played by each part of the sentence. Based on this, the semantic features could be categorized into mandatory and optional. For example, when an action is performed, it is associated with an Agent and an Object. However, location may be an optional feature.

Figure 6:
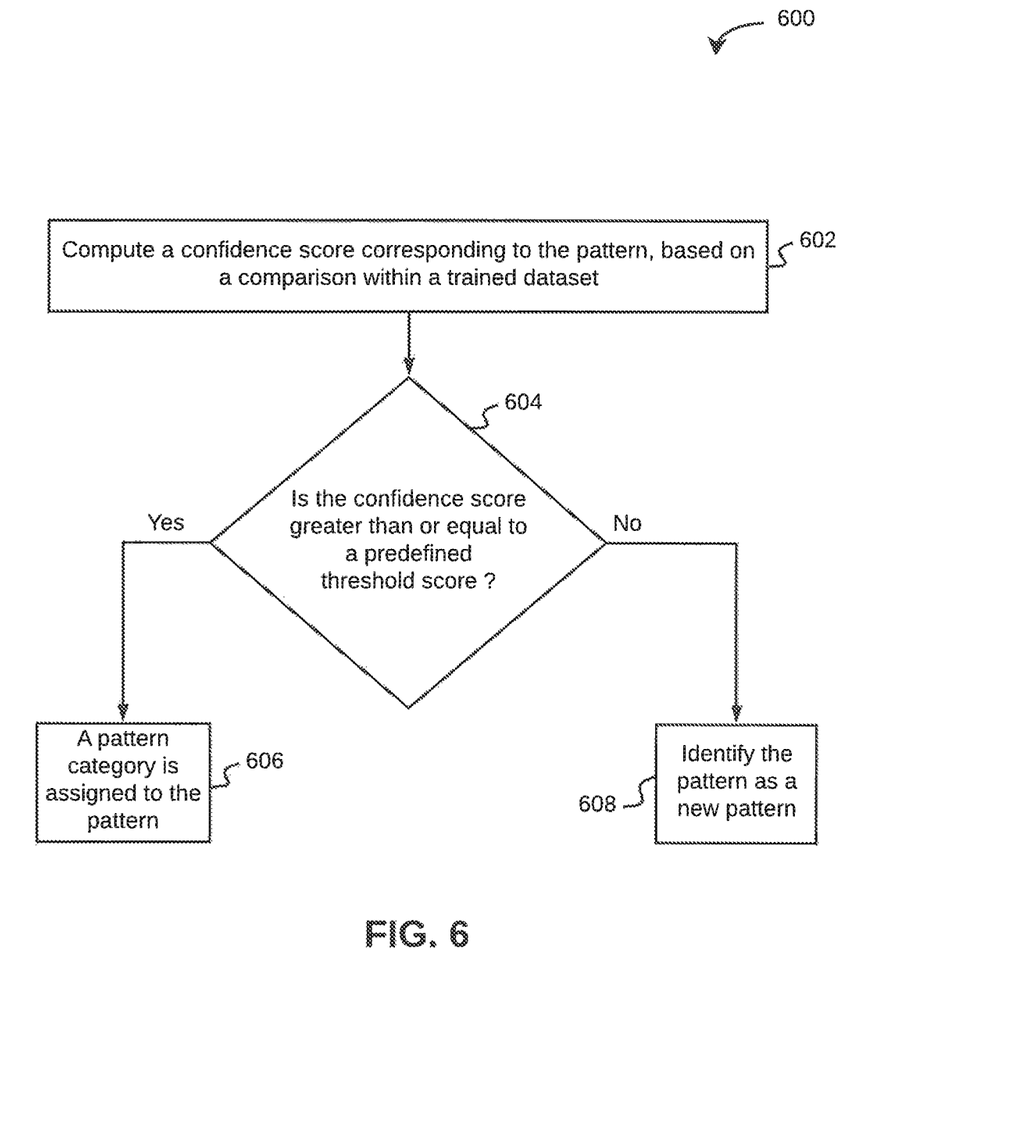
FIG. 6 illustrates a flowchart of a method for identifying new patterns and a pattern category for a pattern created from a sentence, in accordance with an embodiment.

Referring to FIG. 6, a flowchart of a method 600 for identifying new patterns and a pattern category for a pattern created from a sentence, in accordance with an embodiment. At step 602, a confidence score corresponding to a pattern is computed, based on a comparison within a trained dataset. At step 604, a check is performed to determine whether the confidence score is greater than or equal to a predefined threshold score. When the confidence score is greater than or equal to the predefined threshold score, a pattern category is assigned to the pattern at step 606. The pattern category is same as that of a unique pattern in a trained dataset, with which the confidence score for the pattern was determined. This has been explained in detail in conjunction with FIG. 2 and FIG. 3.

Referring back to step 604, when the confidence score is less than the predefined threshold score, the pattern is identified as a new pattern at step 608. The new pattern are may be further matched with trained dataset as described in the method 300 of FIG. 3. This process continues, until no more new patterns are generated and/or no instances are available in the test dataset 204. This has been explained in detail in conjunction with FIG. 2.

Figure 7:
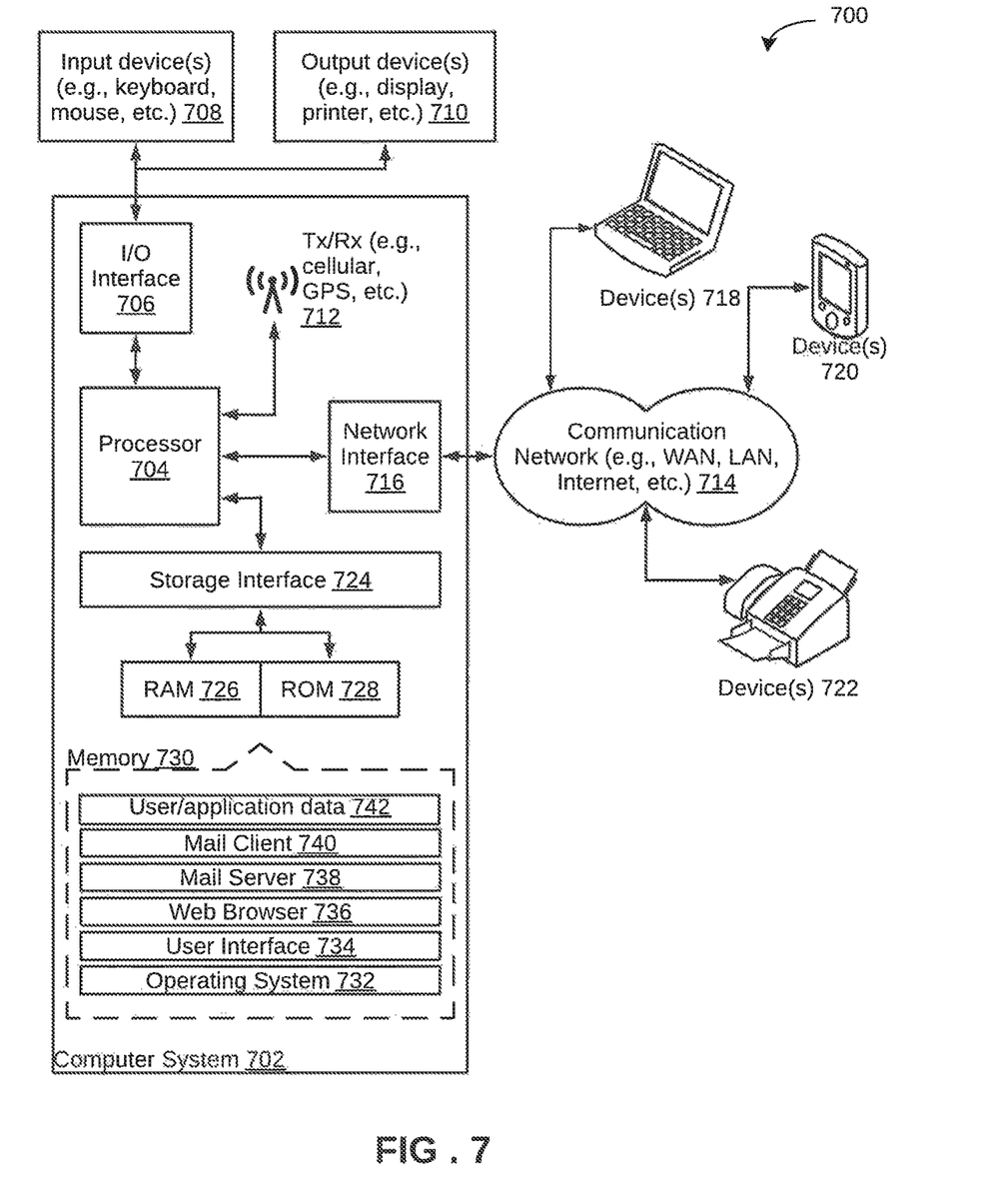
FIG. 7 is a block diagram of an exemplary computer system for implementing embodiments.

Referring now to FIG. 7, a block diagram of an exemplary computer system 702 for implementing various embodiments is illustrated. Computer system 702 may include a central processing unit ("CPU" or "processor") 704. The processor 704 may include at least one data processor for executing program components for executing user or system-generated requests. A user may include a person, a person using a device such as those included in this disclosure, or such a device itself. The processor 704 may include specialized processing units such as integrated system (bus) controllers, memory management control units, floating point units, graphics processing units, digital signal processing units, etc. The processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. The processor 704 may be implemented using mainframe, distributed processor, multi-core, parallel, grid, or other architectures. Some embodiments may utilize embedded technologies like application-specific integrated circuits (ASICs), digital signal processors (DSPs). Field Programmable Gate Arrays (FPGAs), etc.

The processor 704 may be disposed in communication with one or more input/output (I/O) devices via an I/O interface 706. The I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using the I/O interface 706, the computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 710 may be a printer, fax machine, video display (for example, cathode ray tube (CRT), liquid crystal display (LCD), light-emitting diode (LED), plasma, or the like), audio speaker, etc. In some embodiments, a transceiver 712 may be disposed in connection with the processor 704. The transceiver 712 may facilitate various types of wireless transmission or reception. For example, the transceiver 712 may include an antenna operatively connected to a transceiver chip (for example, TEXAS® INSTRUMENTS WILINK WL1286® transceiver, BROADCOM® BCM45501UB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, the processor 704 may be disposed in communication with a communication network 714 via a network interface 716. The network interface 716 may communicate with the communication network 714. The network interface 716 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. The communication network 714 may include, without limitation, a direct interconnection, local area network (LAN), wide area network (WAN), wireless network (for example, using Wireless Application Protocol), the Internet, etc. Using the network interface 716 and the communication network 714, the computer system 702 may communicate with devices 718, 720, and 722. These devices 718, 720, and 722 may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, the computer system 702 may itself embody one or more of these devices 718, 720, and 722.

In some embodiments, the processor 704 may be disposed in communication with one or more memory devices (for example, RAM 726. ROM 728, etc.) via a storage interface 724. The storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 730 may store a collection of program or database components, including, without limitation, an operating system 732, user interface application 734, web browser 736, mail server 738, mail client 740, user/application data 742 (for example, any data variables or data records discussed in this disclosure), etc. The operating system 732 may facilitate resource management and operation of the computer system 702. Examples of the operating systems 732 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. The user interface 734 may facilitate display, execution, interaction, manipulation, or operation of program components through textual or graphical facilities. For example, the user interface 734 may provide computer interaction interface elements on a display system operatively connected to the computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, the computer system 702 may implement a web browser 736 stored program component. The web browser 736 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. The web browsers 736 may utilize facilities such as AJAX, DHTML, ADOBE® FLASH® platform, JAVASCRIPT® programming language, JAVA® programming language, application programming interfaces (APIs), etc. In some embodiments, the computer system 702 may implement a mail server 738 stored program component. The mail server 738 may be an Internet mail server such as MICROSOFT® EXCHANGE® mail server, or the like. The mail server 738 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. The mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 702 may implement a mail client 740 stored program component. The mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, the computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments provides system and method for language independent iterative learning mechanism for NLP tasks. In particular, a universal language independent system is provided to handle various NLP tasks using a semi-supervised iterative learning approach. This system is divided into two major components: language dependent and language independent. The language dependent part focuses on the language specific resources such as morphological analyzer, POS Tagger, parser, etc. The language independent part focuses on defining the features, designing of patterns, scoring and generation of new patterns for identifying the similar and new instances automatically, in an iterative manner.

The language independent part is useful in handling various NLP tasks of different languages. The main contributions of this part is universal pattern representation for each NLP task, unique scoring and masking procedure that is common across text of the languages, and generation of new patterns. The generation of new patterns is performed based on scoring of patterns. The patterns are updated automatically as and when new data arrives.

The claimed steps as discussed above are not routine, conventional, or well understood in the art, as the claimed steps enable the following solutions to the existing problems in conventional technologies. The conventional technologies lack in language independent iterative learning mechanism for NLP tasks. Moreover, in conventional technologies, multi-lingual task in NLP are handled separately and lack in accuracy and efficiency. These conventional technologies do not take into account generation and learning of new language independent patterns based on semantic features along with POS tags, suffix, lemma or the like. The language independent nature of the patterns in the proposed method aid in developing and supporting multi-lingual NLP applications effectively. The present invention thus provides a machine learning based system that acts as a mechanism to handle all NLP tasks of different languages under one platform. In addition, defining of multiple patterns and collating them under different pattern categories play a vital role in providing a universal language independent platform. The patterns are common to all languages under consideration for any NLP task.

As a result of the above invention, various applications, for example, machine translation, information retrieval, information extraction, or the like, are independent of language and generate more accurate results and that too more efficiently. Also, since the platform iteratively creates new patterns based on new data, the platform keeps on learning incrementally, thereby improving performance of the above applications.

The specification has described system and method for language independent iterative learning mechanism for NLP tasks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of language independent iterative learning mechanism for Natural Language Processing (NLP) tasks, the method comprising:
   identifying, by an NLP device, at least one NLP feature associated with a set of words within a sentence for an NLP task;
   identifying, by the NLP device, a linkage relationship between each subset of two adjacent words within the set of words;
   creating a pattern associated with the sentence for the NLP task, based on the at least one NLP feature associated with the set of words and the linkage relationship between each subset of two adjacent words;
   computing a confidence score corresponding to the pattern, based on a comparison within a trained dataset,
      wherein the confidence score is derived based on a weighted average of a first confidence score and a second confidence score,
      wherein the first confidence score is a pattern confidence score determined for the pattern, and wherein the pattern confidence score is independent of the language associated with the sentence and is derived based on a percentage match of the pattern with one of a plurality of unique patterns, and
      wherein the second confidence score is a tuple confidence score determined for each of the set of words in the sentence, and wherein the tuple confidence score is derived based on semantic similarity with at least one of a plurality of unique tuples within the trained dataset, wherein the tuple confidence score is dependent of the language associated with the sentence;
   assigning a pattern category to the pattern, based on the confidence score and a predefined threshold score, wherein the pattern category corresponds to the NLP task; and
   executing the NLP task based on the assigned pattern category.

2. The method of claim 1, wherein the pattern comprises a sequence of the set of words, wherein each subset of two adjacent words in the sequence are interlinked based on an associated linkage relationship.

3. The method of claim 1, wherein the trained dataset is created for the NLP task and comprises at least one of:
   the plurality of unique patterns, wherein each of the plurality of unique patterns corresponds to the at least one NLP feature derived for the NLP task; and
   a plurality of unique tuples derived from the plurality of unique patterns.

4. The method of claim 1, wherein the pattern category is assigned to the pattern when the confidence score is greater than or equal to the predefined threshold score.

5. The method of claim 1 further comprising identifying the pattern as a new pattern, when the confidence score is below the predefined threshold score.

6. The method of claim 1, wherein the at least one NLP feature comprises at least one of morphological suffixes, Part Of Speech (POS) tags, stemming, Hypernym, hyponym, Anaphors, or semantic category.

7. The method of claim 1, wherein the NLP tasks comprises at least one of semantic relations identifications, pronoun resolution, word sense disambiguation, named entity recognition.

8. A system for language independent iterative learning mechanism for Natural Language Processing (NLP) tasks, the system comprising:
a processor; and
a memory communicatively coupled to the processor, wherein the memory stores processor instructions, which, on execution, causes the processor to:
identify at least one NLP feature associated with a set of words within a sentence for an NLP task;
identify a linkage relationship between each subset of two adjacent words within the set of words;
create a pattern associated with the sentence for the NLP task, based on the at least one NLP feature associated with the set of words and the linkage relationship between each subset of two adjacent words;
compute a confidence score corresponding to the pattern, based on a comparison within a trained dataset,
wherein the confidence score is derived based on a weighted average of a first confidence score and a second confidence score,
wherein the first confidence score is a pattern confidence score determined for the pattern, and wherein the pattern confidence score is independent of the language associated with the sentence and is derived based on a percentage match of the pattern with one of a plurality of unique patterns; and
wherein the second confidence score is a tuple confidence score determined for each of the set of words in the sentence, and wherein the tuple confidence score is derived based on semantic similarity with at least one of a plurality of unique tuples within the trained dataset, wherein the tuple confidence score is dependent of the language associated with the sentence;
assign a pattern category to the pattern, based on the confidence score and a predefined threshold score, wherein the pattern category corresponds to the NLP task; and
execute the NLP task based on the assigned pattern category.

9. The system of claim 8, wherein the pattern comprises a sequence of the set of words, wherein each subset of two adjacent words in the sequence are interlinked based on an associated linkage relationship.

10. The system of claim 8, wherein the trained dataset is created for the NLP task and comprises at least one of:
the plurality of unique patterns, wherein each of the plurality of unique patterns corresponds to the at least one NLP feature derived for the NLP task; and
a plurality of unique tuples derived from the plurality of unique patterns.

11. The system of claim 8, wherein the pattern category is assigned to the pattern when the confidence score is greater than or equal to the predefined threshold score.

12. The system of claim 8 further comprising identifying the pattern as a new pattern, when the confidence score is below the predefined threshold score.

13. The system of claim 8, wherein the at least one NLP feature comprises at least one of morphological suffixes, Part Of Speech (POS) tags, stemming, Hypernym, hyponym, Anaphors, or semantic category.

14. The system of claim 8, wherein the NLP tasks comprises at least one of semantic relations identifications, pronoun resolution, word sense disambiguation, named entity recognition.

15. A non-transitory computer-readable storage medium having stored thereon, a set of computer-executable instructions causing a computer comprising one or more processors to perform steps comprising:
identifying at least one NLP feature associated with a set of words within a sentence for an NLP task;
identifying a linkage relationship between each subset of two adjacent words within the set of words;
creating a pattern associated with the sentence for the NLP task, based on the at least one NLP feature associated with the set of words and the linkage relationship between each subset of two adjacent words;
computing a confidence score corresponding to the pattern, based on a comparison within a trained dataset,
wherein the confidence score is derived based on a weighted average of a first confidence score and a second confidence score,
wherein the first confidence score is a pattern confidence score determined for the pattern, and wherein the pattern confidence score is independent of the language associated with the sentence and is derived based on a percentage match of the pattern with one of a plurality of unique patterns; and
wherein the second confidence score is a tuple confidence score determined for each of the set of words in the sentence, and wherein the tuple confidence score is derived based on semantic similarity with at least one of a plurality of unique tuples within the trained dataset, wherein the tuple confidence score is dependent of the language associated with the sentence;
assigning a pattern category to the pattern, based on the confidence score and a predefined threshold score, wherein the pattern category corresponds to the NLP task; and
executing the NLP task based on the assigned pattern category.

* * * * *